Feb. 4, 1941.             J. C. COTNER             2,230,286
                    PACKING SEAL CONSTRUCTION
                       Filed May 2, 1939
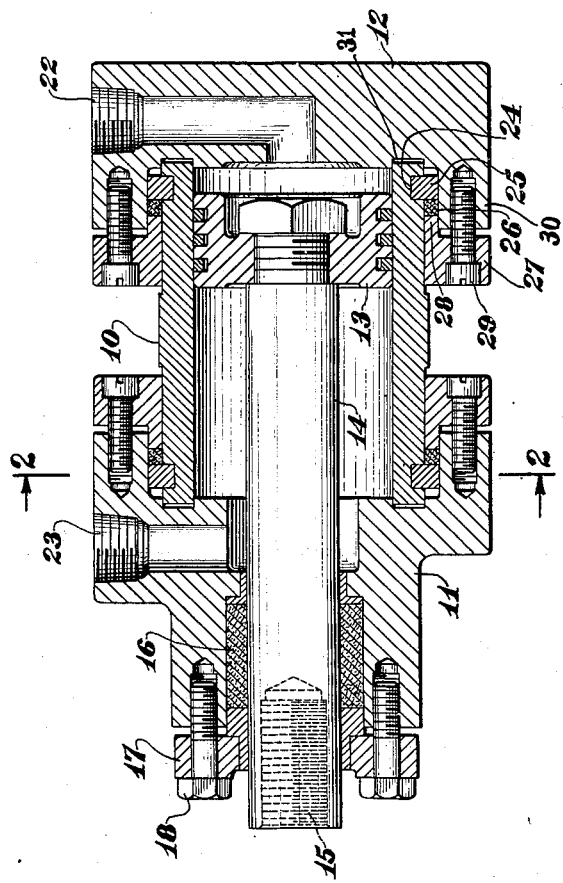
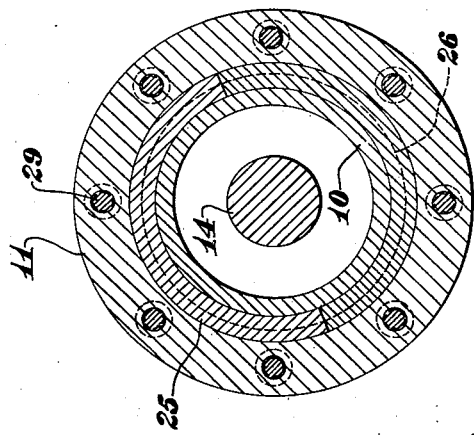
INVENTOR.
John C. Cotner.
BY Hoodling and Krost
            ATTORNEY.

Patented Feb. 4, 1941

2,230,286

UNITED STATES PATENT OFFICE 2,230,286

PACKING SEAL CONSTRUCTION

John C. Cotner, Logansport, Ind., assignor to Logansport Machine, Inc.

Application May 2, 1939, Serial No. 271,374

4 Claims. (Cl. 309—2)

My invention relates in general to packing seal constructions, and more particularly to packing seal constructions which produce an increasing sealing action as the pressure which is confined by the packing seal constructions increases.

My invention will be described in connection with a cylinder construction, and more particularly to the fastening of the cylinder head to the end of the cylinder body or member.

An object of my invention is to provide for increasing the sealing action between the cylinder head and the cylinder body as the cylinder head pressure increases.

Another object of my invention is to provide for securing the cylinder head to the cylinder body by a construction which is all on the outside of the cylinder body, so that substantially the over-all length of the cylinder body is utilized for piston action.

Another object of my invention is the provision of sealing a cylinder head to the cylinder body by utilizing only one packing seal.

Another object of my invention is to provide for placing the packing seal on the outside of the cylinder body to give an increased packing seal area which results in a reduction in the pressure exerted per square inch upon the packing seal.

Another object of my invention is to provide for giving longer life to and better service of the packing seal by reducing the pressure exerted per square inch upon the packing seal.

Another object of my invention is the provision wherein a slight elongation of the means which secures the cylinder head to the cylinder body has substantially no effect upon the actual sealing ability of the packing seal positioned between the cylinder head and the cylinder body.

Another object of my invention is the provision of a packing seal which will withstand a very high pressure with no evidence of leaking whatso ever.

Other objects and a fuller understanding of my invention may be had by referring to the following description and claims, taken in conjunction with the accompanying drawing, in which:

Figure 1 represents a longitudinal cross-sectional view of a cylinder construction embodying the features of my invention, and Figure 2 is a cross-sectional view, taken along the line 2—2 of Figure 1.

With reference to the drawing, the cylinder member or body is indicated by the reference character 10, and may be utilized in connection with pneumatic, fluid or hydraulic machinery of all kinds. Reciprocally mounted within the cylinder member 10, in the ordinary manner, is a piston 13 suitably secured to one end of a piston rod 14 which may be actuated by an external member arranged to threadably engage the female threads 15 provided in the end of the piston rod 14.

As illustrated in the drawing, the cylinder member 10 is provided with two cylinder heads 11 and 12, each having respectively communicating passages or ports 23 and 22 to which external pneumatic, fluid or hydraulic pipe connections may be threadably connected. In accordance with the usual construction, the piston rod 14 may be sealed in the head 11 by a packing seal 16 compressed by a packing retainer cap 17 and the screws 18.

My invention covers the construction by which the cylinder heads 11 and 12 are attached to the ends of the cylinder member 10, and inasmuch as the construction at each end of the cylinder member 10, is the same, I will describe in detail the construction at one end only. The cylinder member 10 is provided near each of its ends with an external annular groove 24 which may be machined therein or provided by any other suitable means or process. Mounted within each of the annular grooves 24 is a keeper means 25 which may be in the form of either a split ring or a continuous ring somewhat like the piston ring used in an automobile piston. As illustrated, each of the cylinder heads is provided with an annular projection portion 30 which extends longitudinally of the cylinder member 10 and fits over and projects beyond the keeper means 25. A suitable packing means 26 is positioned between the annular projection means 30 and the cylinder member 10 and abuts against the keeper means 25. The packing means 26 is preferably of the type formed of a solid ring of packing, and may be a combination of composition and metal, all metal or all iron, copper or steel. An annular packing or compression ring member 27, having an annular shoulder 28, is employed to compress the packing means 26 between the annular projection means 30 and the cylinder member 10 and against the keeper means 25. The cylinder head may be securely fastened to the annular packing or compression ring 27 by means of the threaded members 29. Accordingly, the cylinder head pressure is transmitted through the threaded members 29 and the packing or compression ring 27 to the packing means 26. The transmission of pressure presses the packing means 26 against the keeper means 25 and between the annular projection means 30 and the cylinder member 10 to produce an increasing sealing action as the cylinder head pressure increases.

In assembling a cylinder head to an end of the cylinder 10, the packing or compression ring 27 and the packing means 26 are first slipped over the cylinder 10, after which the keeper means 25 is inserted into an annular groove 24. The cylinder head is then positioned against the open end of the cylinder 10 and is fastened to the packing or compression ring member 27 by the threaded members or screws 29. The cylinder heads may be provided with a relatively shallow annular recess 31 to receive the ends of the cylinder member to aid in centering the heads with respect to the cylinder member and in strengthening the assembly.

An important feature accomplished by my invention is that the higher the pressure in the cylinder, the tighter the seal. In the event a cylinder head attempts to come off the end of the cylinder member 10, the packing means 26 is compressed that much tighter, resulting in a tighter joint to hold the pressure within the cylinder construction. Any slight elongation of the threaded members 29 has substantially no affect upon the actual sealing ability of the assembly. Actual tests show that the construction herein described can withstand a pressure of 5,000 pounds per square inch, with no evidence of leaking whatsoever. Except for the mechanical strength of the parts, there appears to be no limit to the pressure which my construction will withstand.

Another advantage of my invention is that the construction which holds the cylinder head to the cylinder member is all on the outside of the cylinder member, with the result that the entire over-all length of the cylinder member is utilized for effective piston action.

A still further advantage is that my construction presents a strong and durable design which requires only one packing means between a cylinder head and the end portion of the cylinder body. Furthermore, by placing the packing means 26 on the outside of the cylinder body 10, the packing area is enlarged and thus gives a considerable reduction in the pressure exerted per square inch upon the packing means. This reduction in the pressure exerted per square inch upon the packing area gives a much longer life to the packing means and requires very little, if any, service attention.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

1. A cylinder construction comprising, in combination, a cylinder member having open ends and having an external annular groove near each end thereof, keeper means fitting in each of said grooves and having an annular portion thereof extending radially outwardly from the external surface of the cylinder member, a cylinder head for each of the open ends of the cylinder member and having communicating passage means, each of said cylinder heads having an end portion embracing the end of the cylinder member and having an annular projection means extending longitudinally of the cylinder member and fitting over and projecting beyond the keeper means, packing means abutted against each of the keeper means and positioned between the annular projection means of the cylinder head and the cylinder member, an annular gland member surrounding each end portion of the cylinder member and having an annular shoulder abutted against the packing means, and connecting means respectively securing the cylinder heads to the annular gland members and transmitting the cylinder head pressure through the connecting means and the annular gland member to the packing means and compressing same solidly against the keeper means and totally filling the space between the annular projection means of the cylinder head and the cylinder member to produce an increasing sealing action as the cylinder head pressure increases, said cylinder head comprising an integral piece with the inside surface of the end portion extending substantially radially across the end of the cylinder member and meeting the inside surface of the annular projection means close to the keeper means to radially strengthen the entire assembly against the cylinder pressure.

2. In a cylinder construction, in combination, a cylinder member having an open end, said cylinder member having an external circumferential groove relatively close to the open end thereof, keeper means comprising two semi-circular members of a radial thickness greater than the depth of said groove with their inner radial portion closely fitting in said groove and with their outer radial portion extending radially from the external surface of the cylinder member, the ends of said semi-circular members closely abutting each other, a cupped shaped cylinder head for the open end of the cylinder member, the inside bottom of the cupped shaped cylinder head having a circular groove to receive the open end of the cylinder member and the side wall of the cupped shaped cylinder head extending longitudinally of the cylinder member and fitting over and projecting beyond the keeper means, a solid metallic packing ring abutting against the keeepr means and positioned between the said side wall and the cylinder member, compression means having a portion positioned between the side wall and the cylinder member and abutting against the packing ring, and connecting means securing the cylinder head to the compression means and transmitting the cylinder head pressure to the packing ring and compressing same solidly against the keeper means and totally filling the space between the said side wall and the cylinder member to produce an increasing sealing action as the cylinder head pressure increases, said cupped shaped cylinder head comprising an integral piece with the inside edge of the bottom of the cup extending substantially radially across the end of the cylinder member and meeting the inside surface of the side wall close to the keeper means to radially strengthen the entire assembly against the cylinder pressure.

3. A cylinder construction comprising, in combination, a cylinder member having an open end and having an external annular groove near the open end thereof, keeper means fitting in said groove and having an annular portion thereof extending radially outwardly from the external surface of the cylinder member, a cylinder head for the open end of the cylinder member and having communicating passage means, said cylinder head having an end portion embracing the open end of the cylinder member and having an annular projection means extending longitudinally of the cylinder member and fitting over and projecting beyond the keeper means, packing means abutting against the said keeper means and positioned between the annular projection means of the cylinder head and the cylinder member, an annular gland member surrounding the end portion of the cylinder member and having an annular shoulder abutting against the packing means, and connecting means securing the cylinder head to the annular gland member and transmitting the cylinder head pressure through the connecting means and the annular gland member to the packing means and compressing same solidly against the keeper means and totally filling the space between the annular projection means of the cylinder head and the cylinder member to produce an increasing sealing action as the cylinder head pressure increases, said cylinder head comprising an integral piece with the inside surface of the end portion extending substantially radially across the end of the cylinder member and meeting the inside surface of the annular projection means close to the keeper means to radially strengthen the entire assembly against the cylinder pressure.

4. A cylinder construction comprising, in combination, a cylinder member having an open end and having an external annular groove near the open end thereof, keeper means fitting in said groove and having an annular portion thereof extending radially outwardly from the external surface of the cylinder member, a cylinder head for the open end of the cylinder member and having communicating passage means, said cylinder head having an end portion embracing the open end of the cylinder member and having an annular projection means extending longitudinally of the cylinder member and fitting over and projecting beyond the keeper means, packing means comprising a solid metallic ring abutting against the said keeper means and positioned between the annular projection means of the cylinder head and the cylinder member, an annular gland member surrounding the end portion of the cylinder member and having an annular shoulder abutting against the packing means, and connecting means securing the cylinder head to the annular gland member and transmitting the cylinder head pressure through the connecting means and the annular gland member to the packing means and compressing same solidly against the keeper means and totally filling the space between the annular projection means of the cylinder head and the cylinder member to produce an increasing sealing action as the cylinder head pressure increases, said cylinder head comprising an integral piece with the inside surface of the end portion extending substantially radially across the end of the cylinder member and meeting the inside surface of the annular projection means close to the keeper means to radially strengthen the entire assembly against the cylinder pressure.

JOHN C. COTNER.